(12) United States Patent
Dunn (10) Patent No.: US 11,077,450 B2
(45) Date of Patent: Aug. 3, 2021

(54) SERVICE PLATFORM AND JAW CRUSHING ASSEMBLY INCLUDING SAME

(71) Applicant: Terex GB Limited, Dungannon (GB)

(72) Inventor: Gordon Dunn, Omagh (GB)

(73) Assignee: Terex GB Limited, Dungannon (GB)

( * ) Notice: Subject to any disclaimer, the term of this patent is extended or adjusted under 35 U.S.C. 154(b) by 162 days.

(21) Appl. No.: 16/254,671

(22) Filed: Jan. 23, 2019

(65) Prior Publication Data

US 2019/0232300 A1 Aug. 1, 2019

(30) Foreign Application Priority Data

Jan. 24, 2018 (GB) .................................... 1801132

(51) Int. Cl.
| | |
|---|---|
| *B02C 23/00* | (2006.01) |
| *B02C 1/02* | (2006.01) |
| *B02C 1/04* | (2006.01) |
| *B23P 6/00* | (2006.01) |
| *B02C 1/06* | (2006.01) |
| *B02C 19/00* | (2006.01) |
| *E04G 27/00* | (2006.01) |

(52) U.S. Cl.
CPC ................ *B02C 23/00* (2013.01); *B02C 1/02* (2013.01); *B02C 1/04* (2013.01); *B23P 6/00* (2013.01)

(58) Field of Classification Search
CPC ......... B02C 23/00; B02C 19/006; B23P 6/00; E04G 27/00
See application file for complete search history.

(56) References Cited

U.S. PATENT DOCUMENTS

| | | | | |
|---|---|---|---|---|
| 3,079,096 | A * | 2/1963 | McConnell | B02C 1/06 |
| | | | | 241/218 |
| 2016/0303569 | A1* | 10/2016 | Jokiranta | F16F 1/121 |
| 2016/0303570 | A1* | 10/2016 | Jokiranta | F16F 1/121 |
| 2016/0375443 | A1* | 12/2016 | Heikkila | B02C 1/02 |
| | | | | 182/222 |

FOREIGN PATENT DOCUMENTS

EP 3219851 A1 9/2017

OTHER PUBLICATIONS

European Search Report for Application EP19151296, dated May 14, 2019, pp. 1-2.

* cited by examiner

*Primary Examiner* — Adam J Eiseman
*Assistant Examiner* — Mohammed S. Alawadi
(74) *Attorney, Agent, or Firm* — Bond Schoeneck & King, PLLC; George McGuire (57) ABSTRACT

A jaw crusher assembly comprising a jaw crushing apparatus and a service platform. The jaw crushing apparatus having first and second opposing jaws, each opposing jaw having a crushing face. The crushing faces opposing each other in an oblique relationship when the opposing jaws are in an at least partially opened state. The service platform provides at least two service configurations within the opposing jaws and being operable between a first service configuration and a second service configuration by rotation of the service platform.

19 Claims, 11 Drawing Sheets

SERVICE PLATFORM AND JAW CRUSHING ASSEMBLY INCLUDING SAME

CROSS-REFERENCE TO RELATED APPLICATION

The present application relates and claims priority to United Kingdom Application No. 1801132.0, filed on 24 Jan. 2018, the entirety of which is hereby incorporated by reference.

FIELD OF THE INVENTION

This invention relates to jaw crushers and to service platforms for jaw crushers.

BACKGROUND OF THE INVENTION

Jaw crushers are a well known in the material processing industry. A jaw crusher is typically operated by rotating a fly wheel, the rotation of which is translated into a reciprocating movement of a movable jaw relative to a fixed jaw. Jaw crushers possess several component parts which are intended to act as wear plates or liners such that they are replaceable once wear occurs on their working surfaces. Additionally, due to the intense nature of the processing carried out by a jaw crusher and the resulting forces experienced, preventative maintenance and repair are often preformed regularly in order to maintain the jaw crusher in satisfactory working order. Whilst certain portions of the jaw crusher can be accessed externally, wear portions or sites of maintenance or repair located within the crushing cavity can be difficult to access safely, or in a manner which makes carrying out repair or maintenance efficient. Repair platforms have been developed which are insertable between the jaws of the crusher and act as a platform from which repair or maintenance can be carried out. These platforms can be of a fixed design, wherein they span the crushing cavity in one position, or adaptable wherein the platform is provided with at least two parts in a slidable arrangement such that the width of the platform can be adapted to allow spanning of the crushing cavity in more than one location. Whist these solutions do address the problem, the fixed design has limitations in terms of the level of access it provides within the crushing cavity. The adaptable design can often be complicated and time consuming to adapt to different widths, and difficult to judge exactly the width required such that the platform will span the crushing cavity in precisely the correct location.

It would be desirable to mitigate the problems outlined above.

SUMMARY OF THE INVENTION

According to the invention there is provided a jaw crusher assembly comprising a jaw crushing apparatus and a service platform, the jaw crushing apparatus comprising first and second opposing jaws, each opposing jaw having a crushing face, the crushing faces opposing each other in an oblique relationship when the opposing jaws are in an at least partially opened state; wherein the service platform is configured to provide at least two service configurations within the opposing jaws and being operable between a first service configuration and a second service configuration by rotation of the service platform about an axis.

Ideally, the rotation of the service platform is in a plane generally perpendicular to the plane of the crushing faces of the opposing jaws.

Alternatively, the rotation of the service platform is in a plane generally parallel to the plane of the crushing faces of the opposing jaws.

Advantageously, the service platform can be deployed in at least two service configurations within the opposing jaws, providing access for repair or maintenance of the jaw crusher apparatus or components thereof in at least two positions within the opposing jaws.

Further advantageously, deployment between service configurations requires no modification or adaptation to the structure of the service platform.

Ideally, the service platform comprises a first platform, the first platform being configured such that when the service platform is in the first service configuration, the first platform is generally horizontal.

Preferably, the service platform comprises a second platform, the second platform being configured such that when the service platform is in the second service configuration, the second platform is generally horizontal.

Advantageously, in either the first or second service configurations, an operative using the service platform has a generally horizontal platform on which to stand.

Ideally, the service platform further comprises a first spanning portion configured to extend between opposing jaws of the material crushing apparatus in the first service configuration Preferably, the service platform comprises a second spanning portion configured to extend between opposing jaws of the material crushing apparatus in the second service configuration.

Ideally, the service platform is operable between the first service configuration and the second service configuration is by rotating the service platform such that the relevant first or second spanning portion is configured to extend between opposing jaws of the jaw crushing apparatus.

Preferably, in the first service configuration, the length of the first spanning portion, and an interior angle formed between the first spanning portion and the second spanning portion, is such that the first spanning portion spans between the opposing jaws at a first desired location.

Ideally, in the first service configuration the second spanning portion extends generally along one of the opposing jaws.

Advantageously, in the first service configuration the first spanning portion acts to span between the opposing jaws and define a position for the service platform, the second spanning member acting to prevent any rotation or sliding of the service platform to maintain it in this position.

Ideally, in the first service configuration the second spanning portion extends generally along one of the opposing jaws and generally parallel to the crushing face of the one opposing jaw, or generally parallel to the crushing face of a liner installed thereon.

Preferably, in the second service configuration, the length of the second spanning portion, and an interior angle formed between the first spanning portion and the second spanning portion, is such that the second spanning portion spans between the opposing jaws at a second desired location.

Ideally, in the second service configuration, the first spanning portion extends generally along one of the opposing jaws.

Advantageously, in the second service configuration the second spanning portion acts to span between the opposing jaws and define a position for the service platform, the first spanning member acting to prevent any rotation or sliding of the service platform to maintain it in this position.

Preferably, in the second service configuration, the first spanning portion extends generally along one of the opposing jaws, and generally parallel to the one opposing jaw, or generally parallel to the crushing face of a liner installed thereon.

Ideally, the first spanning portion is of fixed length.

Preferably, the second spanning portion is of fixed length.

Ideally, the first and second spanning portions are adjoined at respective first ends.

Preferably, the first and second spanning portions extend from their first ends towards respective second ends.

Ideally, the service platform comprises a third spanning portion extending between the second ends of the first and second spanning portions.

Ideally, the third spanning portion is of fixed length.

Preferably, the third spanning portion is configured to extend between the opposing jaws in both the first service configuration and the second service configuration.

Ideally, the three spanning portions form a triangular arrangement.

Preferably, the opposing jaws form a generally V-shaped crushing cavity when in the at least partially open position.

Preferably, the three spanning portions form a first wedge shape relative to the opposing jaws in the first service configuration.

Ideally, the first wedge shape forms a wedge between the opposing jaws such that the service platform is held in the first service configuration within the V-shaped crushing cavity of the crushing apparatus.

Preferably the three spanning portions form a second wedge shape relative to the opposing jaws in the second service configuration.

Ideally, the second wedge shape forms a wedge between the opposing jaws such that the service platform is held in the second service configuration within the V-shaped crushing cavity of the crushing apparatus.

Advantageously, the wedge shape of the service platform ensures that the weight of an operative thereon does not result in the service platform moving any further into the crushing cavity.

Preferably, in the first service configuration the third spanning portion and the first spanning portion extend between the opposing jaws.

Preferably, the service platform has a first set of jaw member contact points.

Ideally, the first set of jaw member contact points comprises at least first, second, and third jaw member contact points.

Preferably, the first jaw member contact point is a common jaw member contact point locatable at the joined first ends of the first and second spanning portions.

Ideally, the second and third jaw member contact points are locatable at the respective second ends of the first and second spanning portions, at their respective joints with the third spanning portion.

Preferably, the jaw member contact points extend beyond a main cross-section of the service platform and form at least three points of contact between the service platform and the opposing jaws in both the first and second service configurations.

Alternatively, the first set of jaw member contact points comprises more than three jaw contact points.

Preferably, the more than three jaw member contact points define more than three spanning members.

Ideally, where the first set of jaw member contact points comprises more than three jaw contact points, at least three of the jaw member contact points form at least three points of contact between the service platform and the opposing jaws in both the first and second service configurations.

Preferably, the service platform has a matching second set of jaw member contact points which are spaced apart from the first set in a depth-wise dimension.

Preferably, the service platform has a matching second set of jaw member contact points which are spaced apart from the first set in a depth-wise dimension to form spanning portions.

Preferably, the service platform has a matching second set of jaw member contact points which are spaced apart from the first set in a depth-wise dimension to form matching first, second, and third spanning portions.

Ideally, the linear distance between the first and second set of jaw member contact points defines the depth of the service platform.

Preferably, the linear distance between the common jaw member contact point and the second jaw member contact point defines the length of the first spanning portion.

Ideally, the linear distance between the common jaw member contact point and the third jaw member contact point defines the length of the second spanning portion.

Preferably, the jaw member contact points comprise roller means.

Advantageously, the roller means act to reduce the friction between the jaw member contact points and the opposing jaws whilst the service platform is being manoeuvred into the first or second service configuration, or between the first and second service configuration.

Ideally, in the first service configuration, both of the opposing jaw members have liners or wear plates installed thereon.

Alternatively, in the first service configuration, the first or second opposing jaw member, or neither opposing jaw member, have liners or wear plates installed thereon.

Preferably, the liners or wear plates have crushing faces thereon which are in plane with the crushing faces of the opposing jaw members when the liners or wear plates are installed.

Preferably, in the second service configuration, the opposing jaws do not have liners or wear plates installed thereon.

Alternatively, in the second service configuration, the first, second or both of the opposing jaw members have a liner or wear plate installed thereon.

Advantageously, depending on whether one or both opposing jaws have liners or wear plates, and whether the service platform is in the first or the second service configuration, the service platform can be located in variety of positions within the opposing jaws, allowing access to various portions or components of the jaw crushing apparatus for maintenance and/or repair.

Ideally, the opposing jaws of the material crushing apparatus can be locked relative to each other in an at least partially open service position.

Preferably, the at least partially open service position of the opposing jaws creates a crushing cavity between the opposing jaws having a geometry which co-operates with the geometry of the service platform to facilitate placement of the service platform at predefined locations within the crushing cavity such that relevant portions of the jaw crushing apparatus are accessible for maintenance and/or repair.

Advantageously, the opposing jaws can be locked in a position wherein areas of particular interest with regards to maintenance and/or repair are accessible by an operative located on the service platform in either the first or second service configuration within the crushing cavity.

Preferably, the service platform comprises side guards.

Ideally, the side guards comprise generally flat plates having a plurality of throughbores therein, the throughbores of the side guards being alignable with throughbores formed in the service platform.

Preferably, the side guards are attachable to the lateral sides of the service platform by bolts or other suitable fastening means operable through the aligned throughbores of the side guards and the service platform.

Ideally, the side guards project from the lateral sides of the service platform at least partially in the vertical direction and beyond an uppermost portion of the first platform when the service platform is in the first service configuration.

Advantageously, the side guards reduce the likelihood that—tools or other such equipment could fall from the lateral sides of the service platform, or be kicked therefrom by an operator located on the platform.

Preferably, when in the first service configuration, the side guards are removable or repositionable such that they do not project beyond the second spanning portion such that the side guards would prevent or restrict the second spanning member from contacting one of the opposing jaws.

Advantageously, the side guards do not prevent the second spanning portion from extending along the crushing face of one of the opposing jaws, or the crushing face of a liner installed thereon.

Preferably, the side guards project from the lateral sides of the service platform at least partially in the vertical direction and beyond an uppermost portion of the second platform when the service platform is in the second service configuration.

Ideally the service platform comprises an access ladder.

Preferably, the access ladder is extendable from the service platform towards and beyond an upper mouth of the crushing cavity.

Advantageously, an operative may enter the crushing cavity and descend to the service platform from above the crushing cavity.

Ideally, the access ladder is removably attachable to the service platform.

Advantageously, the access ladder can be attached to facilitate descent of an operative but removed once the operative is safely located on the service platform such that the operative is not impeded by the access ladder when carrying out maintenance or repairs.

According to the invention there is provided a service platform for use in a jaw crusher comprising a first platform configured to extend generally horizontally in a first service configuration; and a second platform configured to extend generally horizontally in a second service configuration; wherein the service platform is operable between the first service configuration and the second service configuration by rotation the service platform about an axis such that either the first or the second platform is configured to extend horizontally.

Preferably, the service platform comprising a first spanning portion and a second spanning portion; wherein in the first service configuration, the length of the first spanning portion, and an interior angle formed between the first spanning portion and the second spanning portion, is such that the service platform is held in the first service configuration and the length of the second spanning portion, and an interior angle formed between the first spanning portion and the second spanning portion, is such that the service platform is held in the second service configuration, the first and second spanning portions being adjoined at respective first ends and extend therefrom towards respective second ends, the service platform further comprising a third spanning portion extending between the second ends of the first and second spanning portions, the spanning portions being of fixed length.

According to the invention there is provided a method of maintaining or repairing a jaw crushing apparatus, the method comprising installing a service platform into a generally V-shaped crushing cavity between the opposing jaws in a first service configuration, at least one of the opposing jaws having liners or wear plates installed on their crushing surfaces in the first service configuration.

Preferably, the method further comprising the service platform providing access to the liners or wear plates and attachment means thereof in the first service configuration.

Ideally, the method further comprising removing attachment means of the liners or wear plates, and removing and optionally repairing or preforming maintenance on the liners or wear plates.

Preferably, the method further comprising rotating the service platform such that it is installed in a second service configuration within the opposing jaws, wherein the liners or wear plates are removed.

Ideally, the service platform provides access to side plates of the jaw crusher or attachment means of the side plates in the second configuration, the side plates extending laterally between the opposing jaws.

Preferably, the method comprising repairing and/or maintaining and/or replacing the side plates.

Ideally, the method further comprising rotating the service platform back into the first service configuration such that access is provided to re-install existing or install replacement liners or wear plates.

Preferably the method comprising removing the service platform from the jaw crusher apparatus.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

An embodiment of the invention is now described with reference to an exemplary jaw crusher assembly. It will be understood that the exemplary jaw crusher assembly is provided to assist in an understanding of the present teaching and is not to be construed as limiting in any fashion. Furthermore, elements or components that are described with reference to any one Figure may be interchanged with those of other Figures or other equivalent elements without departing from the spirit of the present invention.

Figure 8:
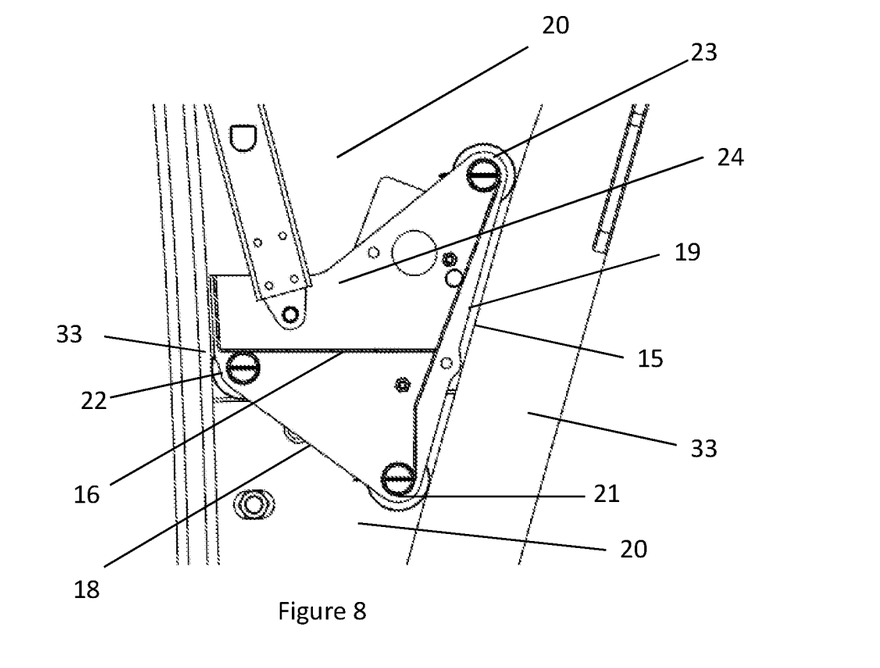
FIG. 8 is an enlarged view of the service platform installed in the first service configuration.
Figure 9:
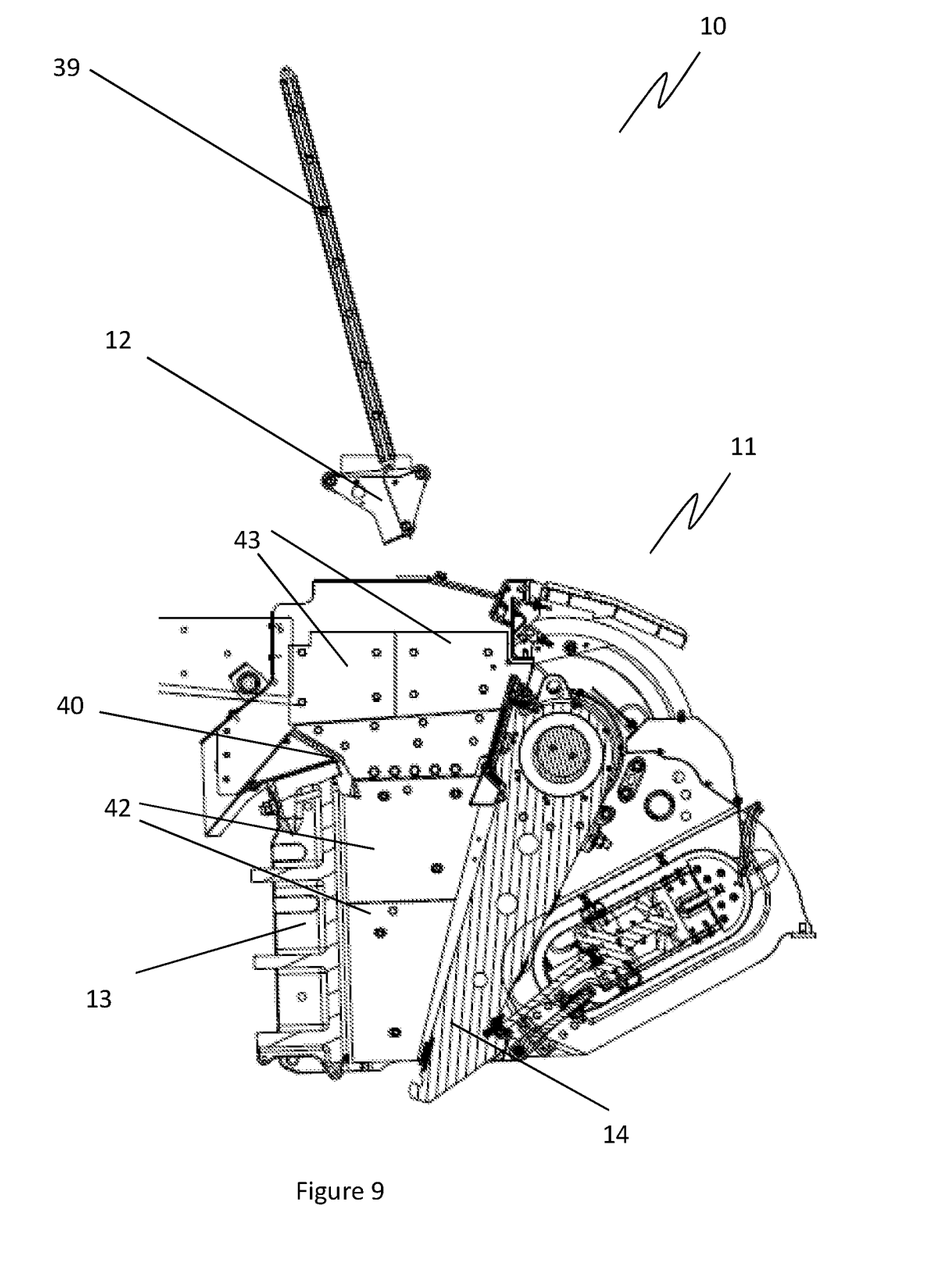
FIG. 9 is a sectional side view of the jaw crusher assembly showing opposing jaw members of the jaw crushing apparatus having liners removed therefrom.
Figure 10:
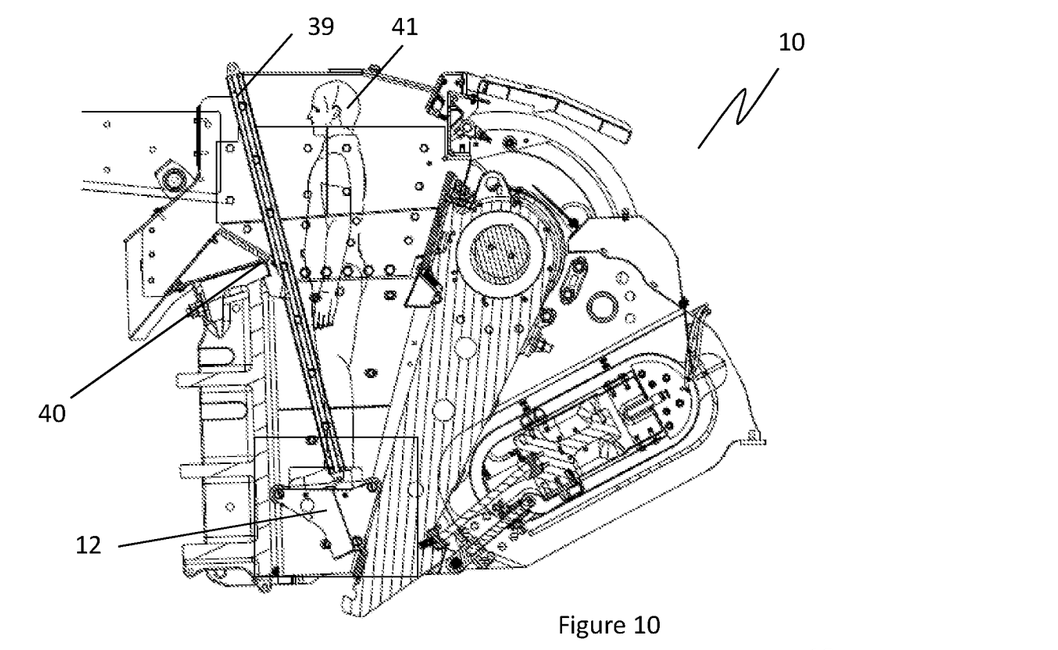
FIG. 10 is a side sectional view of the jaw crusher assembly as shown in FIG. 9 showing the service platform deployed in a second service configuration.
Figure 11:
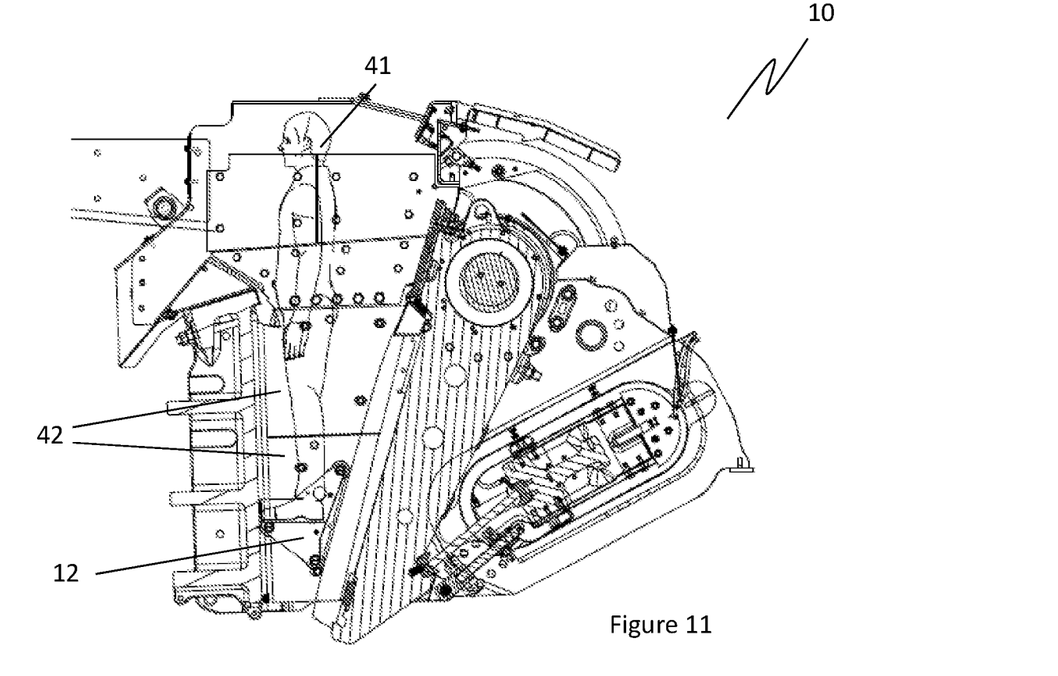
FIG. 11 is a sectional side view of the jaw crusher assembly showing the first opposing jaw member having no liner and the second opposing jaw member having a liner installed, the service platform being deployed in a first service configuration.
Figure 12:
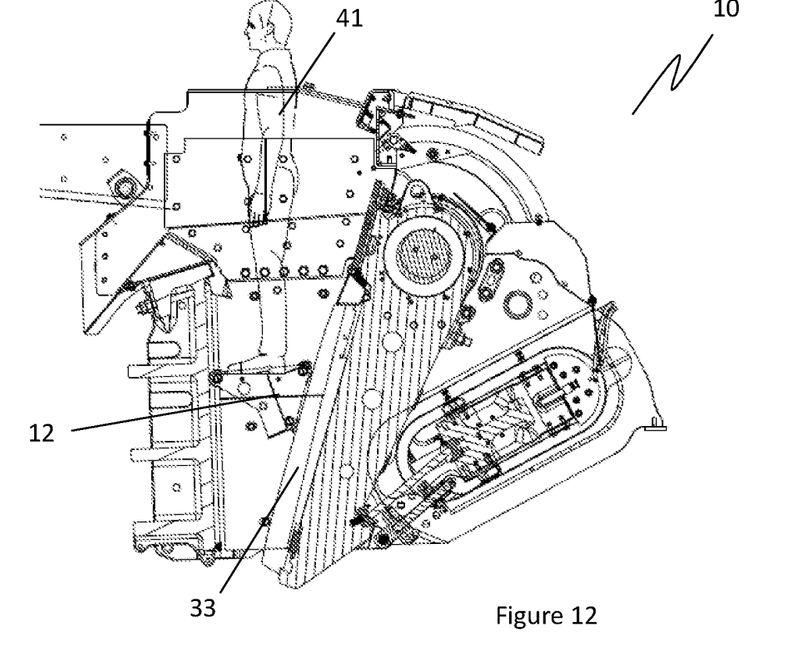
FIG. 12 is a sectional side view of the jaw crusher assembly as shown in FIG. 11, the service platform being deployed in the second service configuration.
Figure 13:
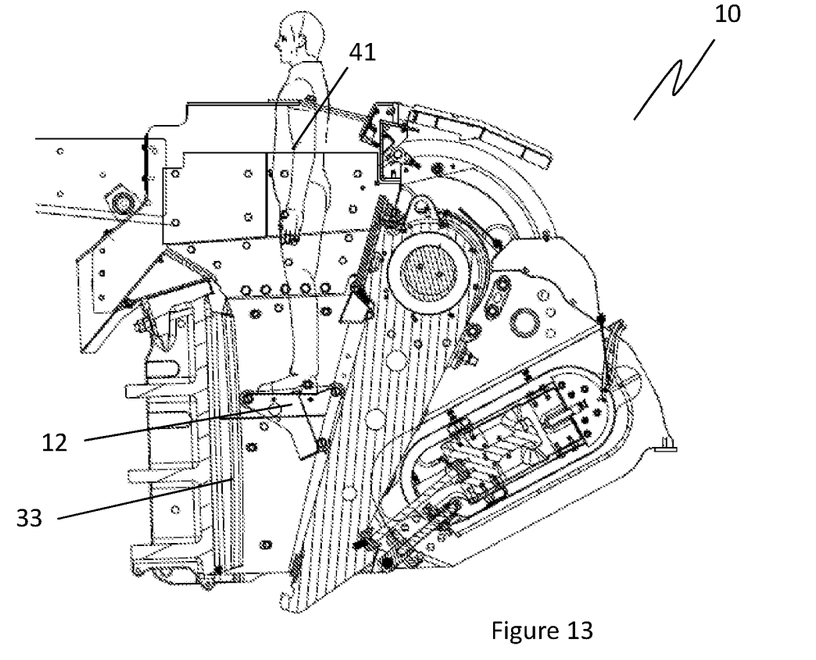
FIG. 13 is a sectional side view of the jaw crusher assembly showing the first opposing jaw member having a liner and the second opposing jaw member having no liner, the service platform being deployed in the second service configuration.
Figure 14:
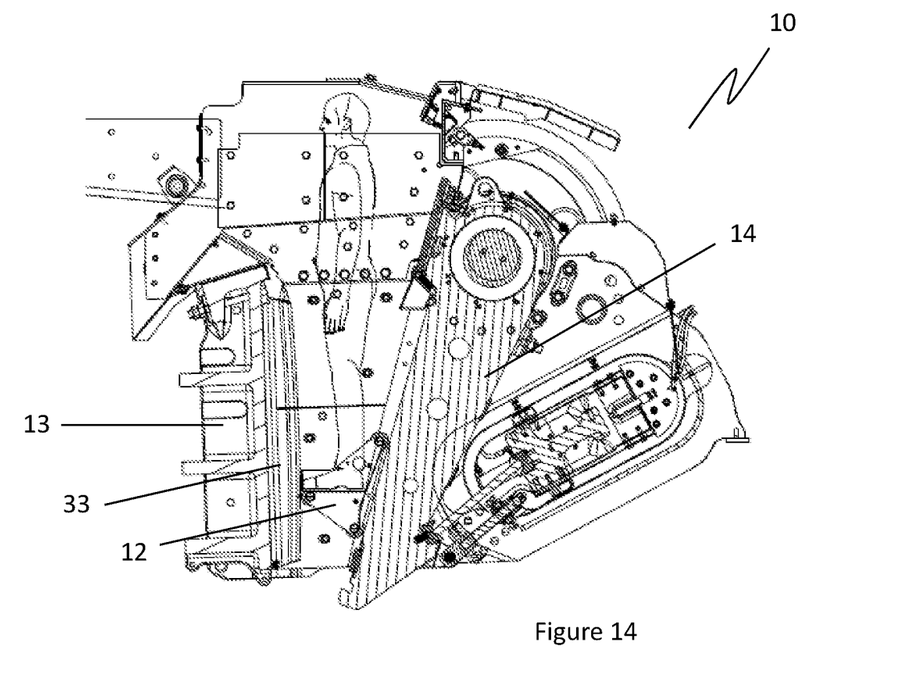
FIG. 14 is a sectional side view of the jaw crusher assembly as shown in FIG. 13, the service platform being deployed in the first service configuration.
Figure 15:
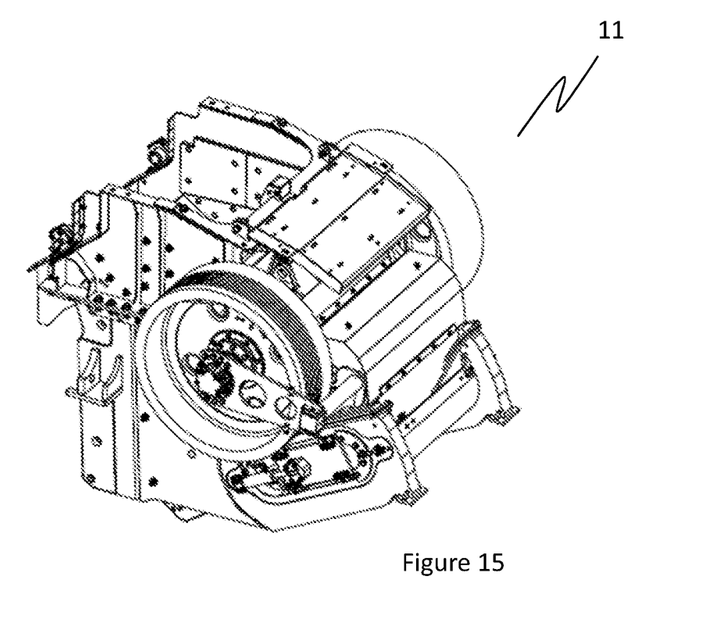
FIG. 15 is a perspective view of a jaw crushing apparatus.
Figure 16:
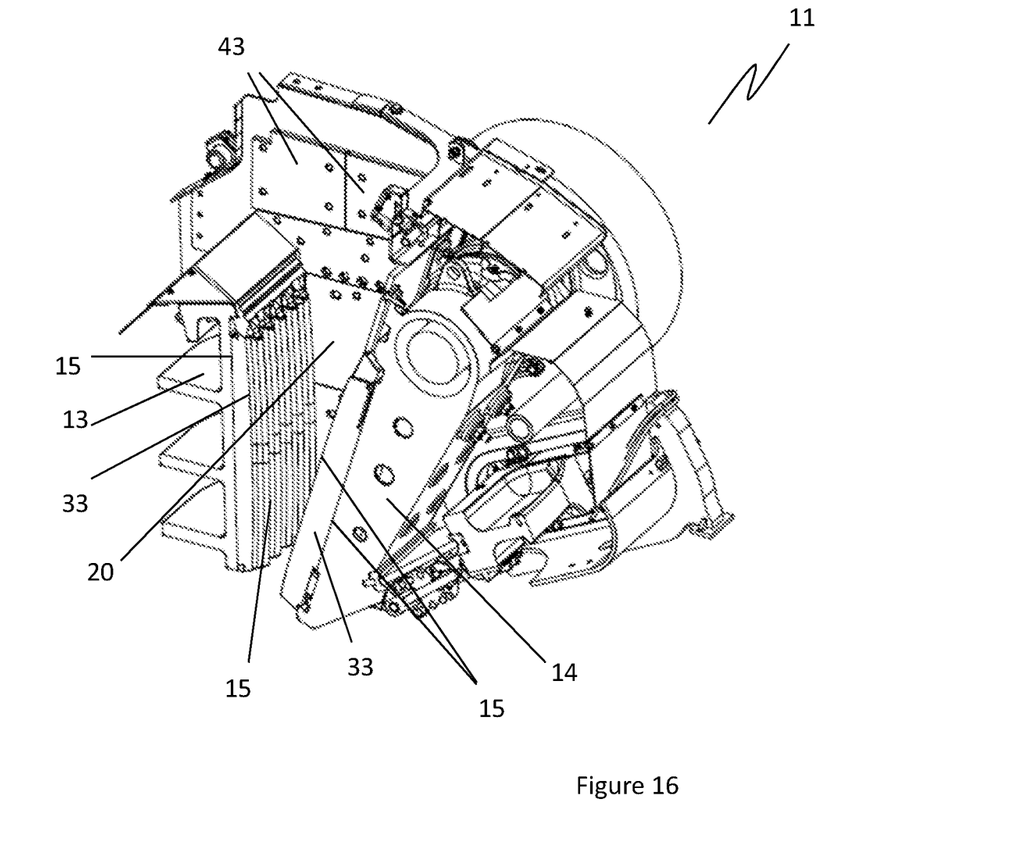
FIG. 16 is a sectional view of FIG. 16.

Referring now to the accompanying drawings, there is illustrated a jaw crusher assembly 10 comprising a jaw crushing apparatus 11 and a service platform 12. The jaw crushing apparatus 10 comprises first and second opposing jaws 13, 14, each opposing jaw having a crushing face 15. The crushing faces 15 oppose each other in an oblique relationship when the opposing jaws 13, 14 are in an at least partially opened state, as can be seen in FIG. 16. The service platform 12 is configured to provide at least two service configurations within the opposing jaws 13, 14. The service platform 12 is operable between a first service configuration, as shown in FIG. 8, and a second service configuration as shown in FIG. 10, by rotating the service platform 12 about an axis. When the platform 12 is in situ, the rotation is in a plane generally perpendicular to the planes of the crushing faces 15 of the opposing jaws 13, 14, i.e. about an axis that is parallel with the crushing faces. In the embodiment shown in the drawings, the service platform 12 is rotated approximately 110 degrees anti-clockwise from the first service configuration to the second service configuration. As a result, the service platform 12 can be deployed in at least two service configurations within the opposing jaws 13, 14, providing access for repair or maintenance of the jaw crusher apparatus 10 or components thereof in at least two positions within the opposing jaws 13, 14. In addition, deployment between service configurations requires no modification or adaptation to the structure of the service platform 12. The service platform 12 has a first platform 16. The first platform 16 is generally horizontal when the service platform 12 is in the first service configuration, as can best be seen in FIG. 8. The service platform 12 also has a second platform 17, which is generally horizontal when the service platform 12 is in the second service configuration, which can best be seen in FIG. 10. Consequently, in either the first or second service configurations, an operative using the service platform 12 has a generally horizontal platform on which to stand. It will be seen that the service platform 12 is rotatable about an axis that is parallel with the first and second platforms 16, 17 in order to determine which platform 16, 17 is in use.

The service platform 12 has a first spanning portion 18 which extends between opposing jaws 13, 14 of the material crushing apparatus 11 in the first service configuration. The service platform has a second spanning portion 19 which extends between opposing jaws 13, 14 of the material crushing apparatus 11 in the second service configuration. The service platform 12 is operable between the first service configuration and the second service configuration by rotating the service platform 12 such that the relevant first 18 or second 19 spanning portion extends between opposing jaws 13, 14 of the jaw crushing apparatus 11. In the first service configuration, the length of the first spanning portion 18, and an interior angle formed between the first spanning portion 18 and the second spanning portion 19 is such that the first spanning portion spans between (and engages with) the opposing jaws at a first desired location thereby maintaining the platform 12 at the first location. The desired location is a location wherein the service platform 12 is maintained in position within the opposing jaws 13, 14 such that the first platform 16 is generally horizontal and at a location wherein an operative can access relevant portions of the jaw crushing apparatus 11 for repair or maintenance. In the first service configuration the second spanning portion 19 extends generally along the second opposing jaw member 14 or liner 33 thereof, parallel to the crushing surface 15 of the second jaw member 14. Resultantly, in the first service position, the first spanning portion 18 acts to span between the opposing jaws 13, 14 and define a vertical position for the service platform 12 within the generally V-shaped crushing cavity 20 formed between the opposing jaws 13, 14, and the second spanning portion 19 acts to prevent any rotation or sliding of the service platform 12 to maintain it in this position.

In the second service configuration, the length of the second spanning portion 19, and an interior angle formed between the first spanning portion 18 and the second spanning portion 19, is such that the second spanning portion 19 spans between (and engages with) the opposing jaws 13, 14 at a second desired location thereby maintaining the platform 12 at the second location. The desired location is a location wherein the service platform 12 is maintained in position within the opposing jaws 13, 14 such that the second platform 17 is generally horizontal and at a location wherein an operative can access relevant portions of the jaw crushing apparatus 11 for repair or maintenance, at least some of these portions being inaccessible in the first service configuration or simply more easily accessible in the second service configuration. In the second service configuration, the first spanning portion 18 extends generally along the second opposing jaw member 14 or liner 33 thereof. In the second service configuration the second spanning portion 19 acts to span between the opposing jaws 13, 14 and define a vertical position for the service platform 12 within the crushing cavity 20, the first spanning portion acting to prevent any rotation or sliding of the service platform 12 to maintain it in this position. In the second service configuration, the first spanning portion 18 extends generally along the second opposing jaw member 14 or a liner 33 thereof, and generally parallel to the crushing surface 15 of the second opposing jaw member 14.

Figure 1:
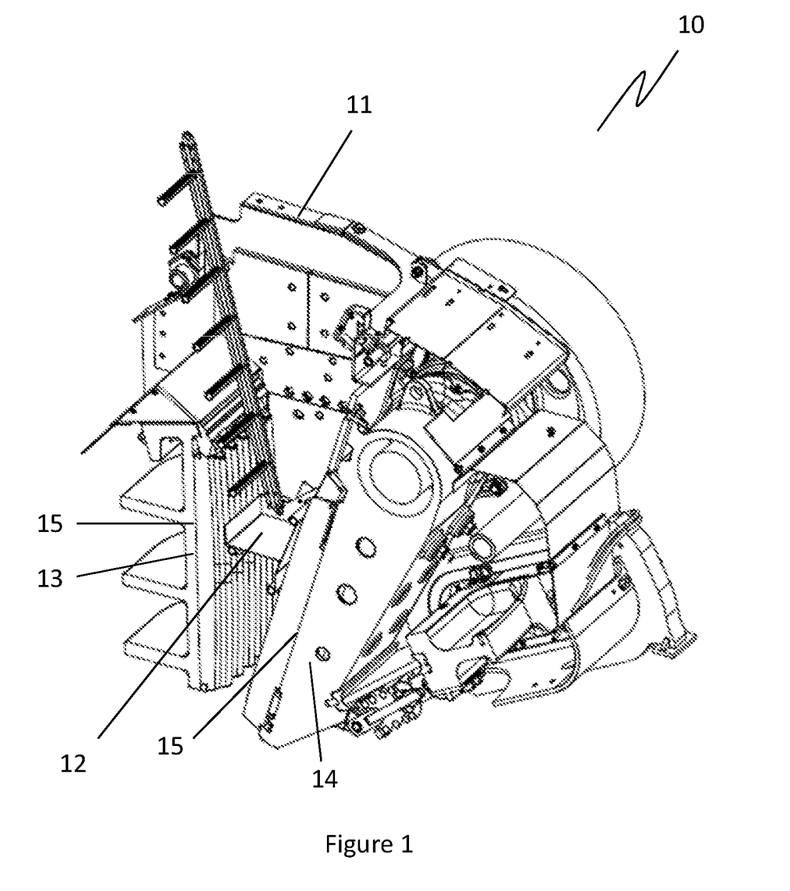
FIG. 1 is a perspective sectional view of a jaw crusher assembly according to the invention.
Figure 2:
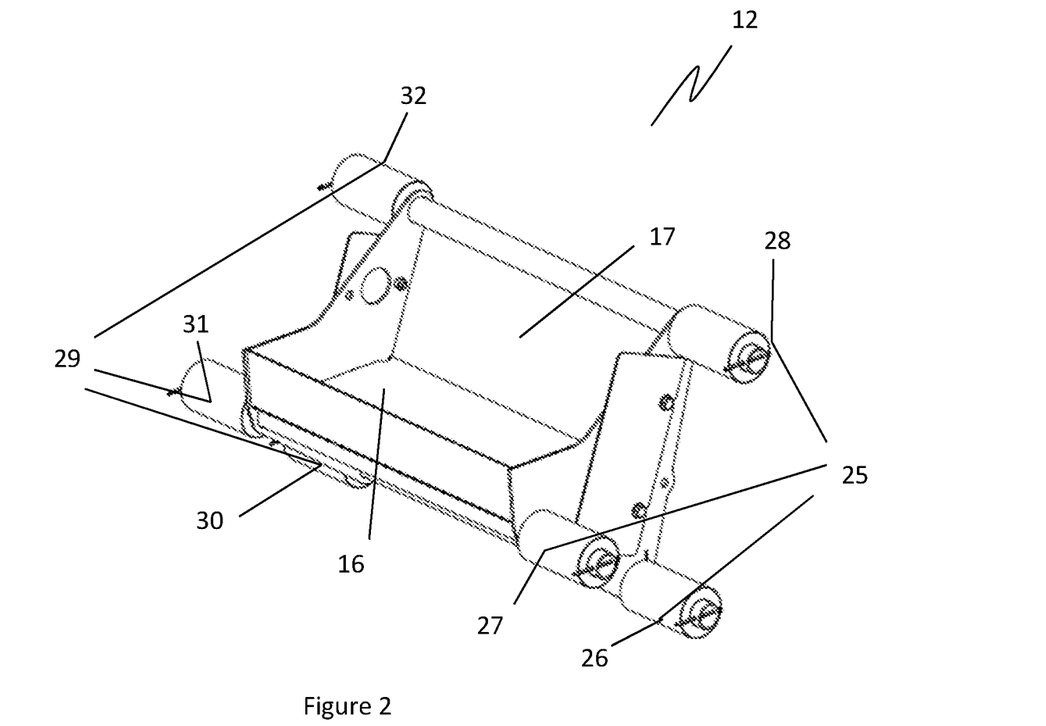
FIG. 2 is a perspective view of a service platform of the jaw crusher assembly according to the invention showing a first platform.
Figure 3:
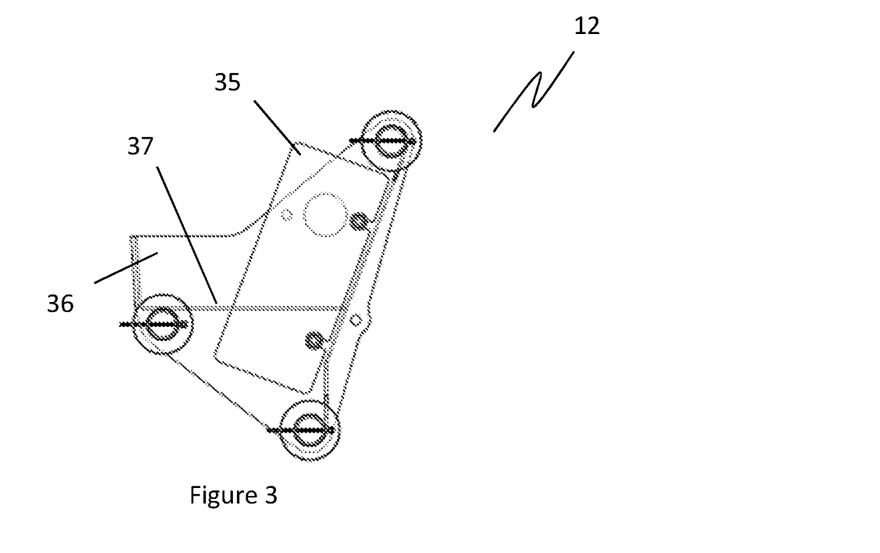
FIG. 3 is a side view of the service platform of FIG. 2.
Figure 4:
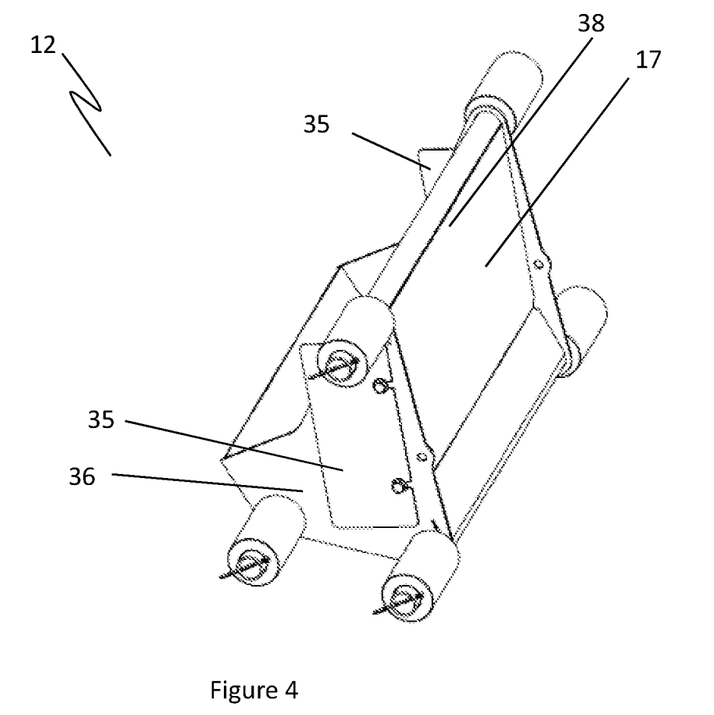
FIG. 4 is a perspective view of the service platform of the jaw crusher assembly according to the invention showing a second platform.
Figure 5:
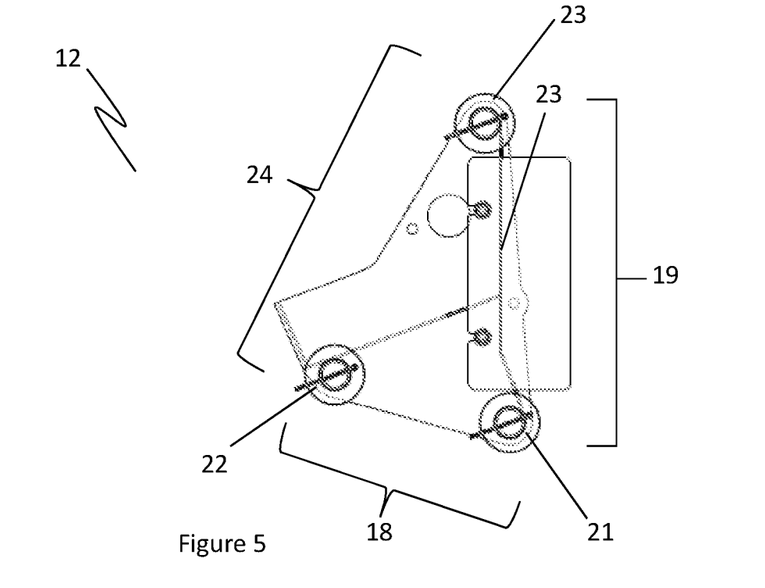
FIG. 5 is a side view of the service platform of FIG. 4.
Figure 6:
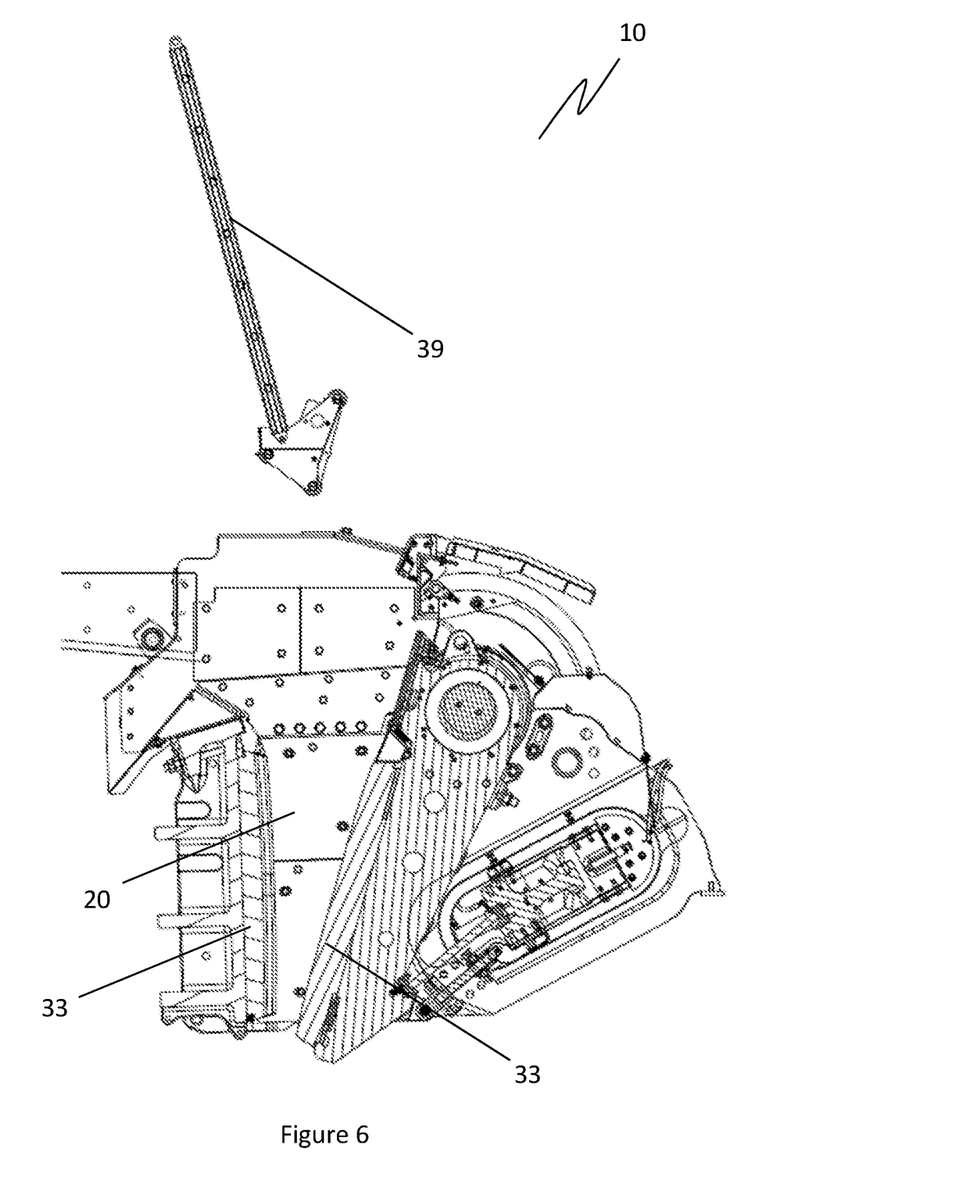
FIG. 6 is a sectional side view of the jaw crusher assembly showing opposing jaw members of the jaw crushing apparatus having liners installed thereon.
Figure 7:
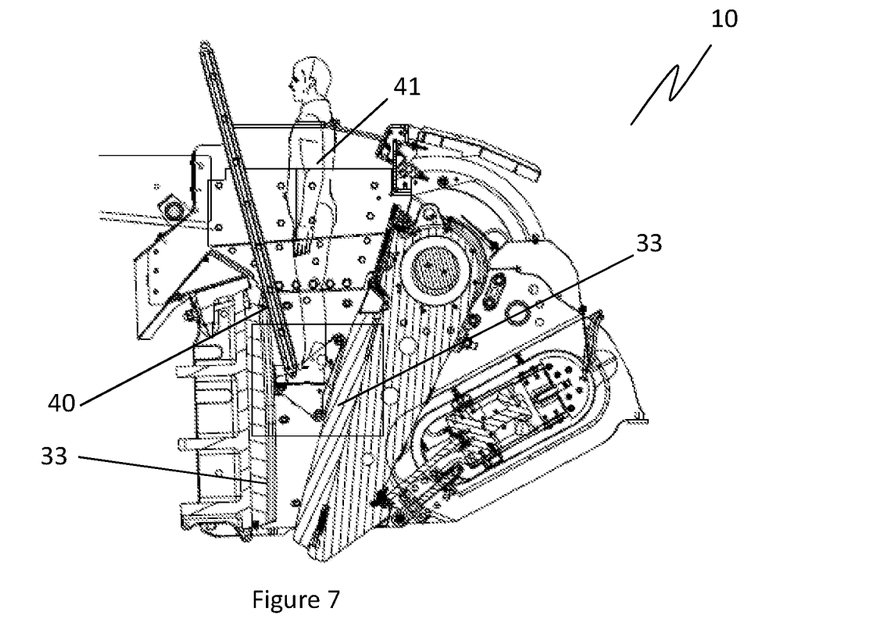
FIG. 7 is a side sectional view of the jaw crusher assembly as shown in FIG. 6 showing the service platform deployed in a first service configuration.

The first spanning portion 18 and second spanning portion 19 are of fixed length and are adjoined at respective first ends 21. The first and second spanning portions 18, 19 extend from their first ends 21 towards respective second ends 22, 23, and a third spanning portion 24 extends between the second ends 22, 23 of the first and second spanning portions 18, 19, as best viewed in FIG. 5. The third spanning portion 24 is also of fixed length and is configured to extend between the opposing jaws 13, 14 in both the first service configuration and the second service configuration.

The three spanning portions 18, 19, 24 form a triangular arrangement. The triangular arrangement forms a first wedge shape relative to the opposing jaws 13, 14 in the first service configuration such that the service platform 12 is held in the first service configuration within the V-shaped crushing cavity 20 of the crushing apparatus 11. The first wedge shape has geometry which compliments the geometry of the generally V-shaped 20 cavity at a location vertically within the generally V-shaped cavity 20 such that the service platform 12 becomes wedged in the generally V-shaped cavity 20 with the first platform 16 generally horizontal and at a desired vertical location relative to and within the opposing jaws 13, 14, as is best seen in FIG. 8.

The geometry of the three spanning portions is such that, upon rotation of the service platform 12 into the second service configuration, a second, different, wedge shape is formed relative to the opposing jaws, 13, 14. The second wedge shape forms a wedge between the opposing jaws 13, 14 such that the service platform 12 is held in the second service configuration within the V-shaped crushing cavity 20 of the crushing apparatus 11. The second wedge shape has geometry which compliments the geometry of the generally V-shaped 20 cavity at a location vertically within the generally V-shaped cavity 20 such that the service platform 12 becomes wedged in the generally V-shaped cavity 20 with the second platform 17 generally horizontal and at a desired vertical location relative to and within the opposing jaws 13, 14, as can be seen in FIG. 10. In either the first service configuration or the second service configuration, the wedge shape of the service platform 12 ensures that the weight of an operative thereon does not result in the service platform 12 moving any further vertically into the generally V-shaped crushing cavity 20. In the embodiment shown in the drawings, the second wedge shape is a wider wedge shape than the first wedge shape.

In the first service configuration the third spanning portion 24 and the first spanning portion 18 extend between the opposing jaws 13, 14, and the second spanning portion 19 extends along the crushing face 15 of the second opposing jaw member 14, or along the crushing face 15 of a liner 33 installed thereon. In the second service configuration the third spanning portion 24 and the second spanning portion 19 extend between the opposing jaws 13, 14, and the first spanning portion 18 extends along a crushing face 15 of the second opposing jaw member 14, or along the crushing face 15 of a liner 33 installed thereon. In the embodiment shown in the drawings, the first opposing jaw member 13 is a fixed jaw member 13 and the second opposing jaw member 14 is a movable jaw member 14. However, it will be understood that either or both jaw members could be movable jaw members. The service platform 12 has a first set 25 of three jaw member contact points 26, 27, 28. The first jaw member contact point is a common jaw member contact point 26 and is located at the common first end 21 of the first and second spanning portions 18, 19. Second and third jaw member contact points 27, 28 are located at the respective second ends 22, 23 of the first and second spanning portions at their respective joints with the third spanning portion 24. The jaw member contact points extend beyond a main cross-section of the service platform 12 and form three points of contact 26, 27, 28 between the service platform 12 and the opposing jaws 13, 14, or their liners 33, in both the first and second service configurations. The service platform 12 has a matching second set 29 of three jaw member contact points 30, 31, 32 which are spaced apart from the first set, the linear distance between the first and second set of jaw member contact points defining the depth of the service platform 12. The linear distance between the common jaw member contact point 26 and the second jaw member contact point 27 defines the length of the first spanning portion. The linear distance between the common jaw member contact point 26 and the third jaw member contact point 28 defines the length of the second spanning portion. The jaw member contact points 26, 27, 28, 30, 31, 32 comprise roller means which act to reduce the friction between the jaw member contact points 26, 27, 28, 30, 31, 32 and the opposing jaws 13, 14 whilst the service platform is being manoeuvred into the first or second service configuration.

In the first service configuration or the second service configuration, the opposing jaws 13, 14 may have liners 33 installed thereon. Alternatively only one or the other, or neither of the opposing jaws 13, 14 may have a liner 33 installed thereon. The liners 33 have crushing faces 15 thereon which are in plane with the crushing faces 15 of the opposing jaw members 13, 14 when the liners are installed. The desired positions of the service platform 12 within the opposing jaws 13, 14 in both the first and second service configurations are generally pre-defined positions and are dictated by the position of portions of the jaw crushing apparatus 11 which must be accessed in order to carry out repairs or maintenance, for example the location of attachment bolts of liners, wear plates, cheek plates, etc. The geometry of the service platform 12 is such that various desired locations of the service platform 12 are achievable depending on whether the service platform is in the first or second service condition, and whether one, both, or neither of the opposing jaw members 13, 14 have liners 33 thereon. The opposing jaws 13, 14 of the material crushing apparatus can be locked in an at least partially open service position creating a crushing cavity 20 between the opposing jaws having a geometry which co-operates with the geometry of the service platform 12 to facilitate placement of the service platform 12 at the pre-defined positions. As a result, the opposing jaws 13, 14 can be locked in a position wherein areas of particular interest with regards to maintenance and/or repair are accessible by an operative located on the service platform 12 in either the first or second service configuration within the crushing cavity 20. The locked position of the opposing jaws 13, 14 may be adapted such that the pre-defined positions of the service platform 12 in both the first and second service configuration can be further varied in addition to the variation provided by the presence or lack of presence of liners on the first and/or second jaw opposing jaw members 13, 14.

The service platform 12 has two side guards 35 which are generally flat plates having a plurality of throughbores therein. The throughbores of the side guards are alignable with throughbores formed in the service platform 12. The side guards 35 are attachable to each lateral side 36 of the service platform 12 by bolts or other suitable fastening means operable through the aligned throughbores of the side guards 35 and the service platform 12. The side guards 35 project from the lateral sides 36 of the service platform 12 at least partially vertically and beyond an uppermost portion 37 of the first platform 16 when the service platform 12 is in the first service configuration. The side guards 35 project from the lateral sides 36 of the service platform 12 at least partially vertically and beyond an uppermost portion 38 of the second platform 17 when the service platform 12 is in the second service configuration. The side guards 35 reduce the likelihood that tools or other such equipment could fall from the lateral sides 36 of the service platform 12, or be kicked from the platform 12 by an operative. When in the first service configuration, the side guards 35 are removable or repositionable such that they do not project beyond the second spanning portion 19. As a result, the side guards 35 do not prevent the second spanning portion 19 from extending along the crushing face 15 of one of the opposing jaws or of a liner 33 thereon.

The service platform 12 also may have an access ladder 39 which is extendable from the service platform 12 towards and beyond an upper mouth 40 of the crushing cavity 20. An operative 41 may enter the crushing cavity 20 and descend to the service platform 12 via the access ladder 39 from above the crushing cavity 20. The access ladder 39 is removably attachable to the service platform 12 and can be attached to facilitate descent of an operative 41 but removed once the operative 41 is safely located on the service platform 12 such that the operative 41 is not impeded by the access ladder 39 when carrying out maintenance or repairs.

Figures 17, 17A, 17B:
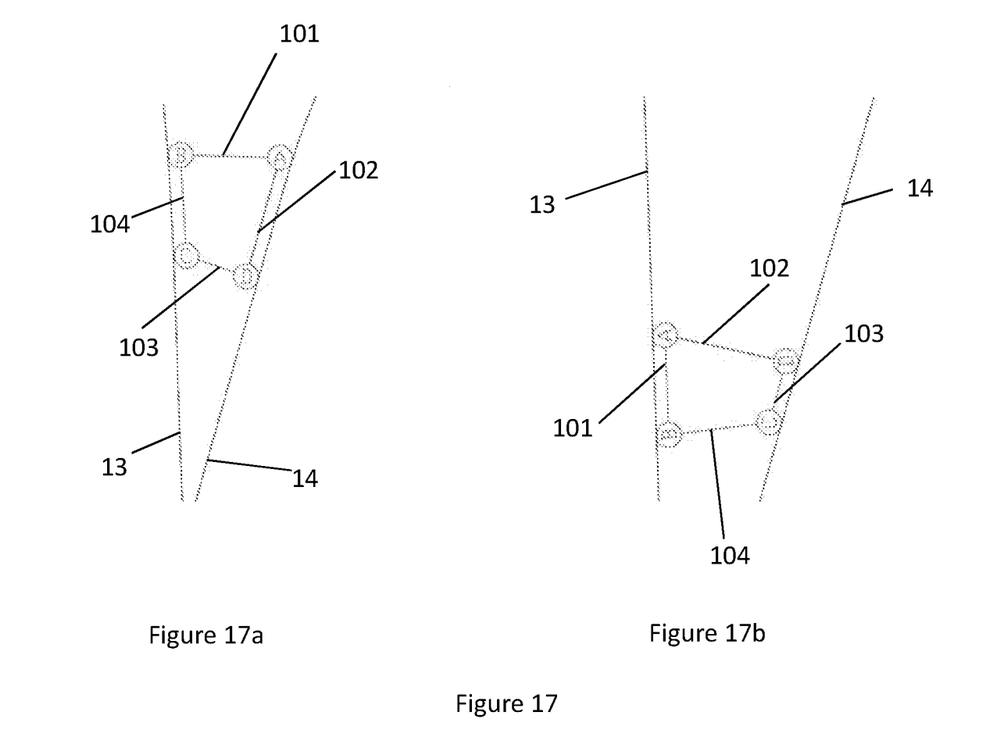
FIGS. 17a and 17b are is side schematic views of a second embodiment of the invention having more than three jaw member contact points.

In alternative embodiments of the invention, the service platform may have any reasonable number of spanning portions defined by the same number of jaw member contact points. The service platform is rotatable such that at least two spanning portions span between the opposing jaw members 13, 14 in each service configuration. This is best illustrated in FIG. 17, which shows an embodiment with four spanning portions, 101, 102, 103, 104 defined by four jaw member contact points A, B, C, D. In FIG. 17*a*, the service platform is in a first service configuration with spanning portion 101 and spanning portion 103 both spanning between the opposing jaw members 13, 14. Rotation of the service platform into a second service configuration as shown in FIG. 17*b* results in spanning portion 102 and spanning portion 104 spanning between the opposing jaw members 13, 14. It should be understood that an even greater number of spanning portions may be present and the invention will function as intended providing that at least three jaw member contact points are in contact with the jaw members 13, 14 when the service platform is in a service configuration. Typically, the service platform 12 is rotatable about an axis that is parallel with the spanning portions.

In use, the jaw crusher assembly 10 is employed in a method of maintaining or repairing a jaw crushing apparatus 11, the method comprising installing a service platform 12 into a generally V-shaped crushing cavity 20 between the opposing jaws 13, 14 in a first service configuration, the opposing jaws 13, 14 having liners 33 installed on their crushing surfaces 15 in the first service configuration. The service platform 12 provides access to the liners 33 and attachment means thereof in the first service configuration, and also access to chute liners 43 and attachment means thereof. The method further comprising removing attachment means of the liners 33, and removing and optionally repairing or preforming maintenance on the liners 33, before rotating the service platform 12 such that it is installed in a second service configuration within the opposing jaws 13, 14, wherein the liners 33 have been removed. The service platform 12 provides access to side plates 42 of the jaw crusher or attachment means of the side plates in the second configuration, the side plates 42 extending laterally between the opposing jaws 13, 14. The method comprising repairing and/or maintaining and/or replacing the side plates 42 before rotating the service platform 12 back into the first service configuration such that access is provided to re-install existing or install replacement liners 33. Finally, the service platform 12 is removed allowing normal operation of the jaw crushing apparatus. It should be noted that this is simply one example of use of the jaw crushing assembly, however the service platform may be used in the first or second configuration with neither, one, or both opposing jaws 13, 14 having liners 33 thereon such that its use can be varied to suit any required repair or maintenance situation.

The invention is not limited to the embodiments described herein but can be amended or modified without departing from the scope of the present invention.

What is claimed is:

1. A jaw crusher assembly comprising a jaw crushing apparatus and a service platform, the jaw crushing apparatus comprising:
    first and second opposing jaws, each opposing jaw having a crushing face, the crushing faces opposing each other in an oblique relationship when the opposing jaws are in an at least partially opened state;
    wherein the service platform is configured to provide at least two service configurations within the opposing jaws and being operable between a first service configuration and a second service configuration by rotation of the service platform;
    and wherein said service platform has a wedge shaped geometry whereby in said first service configuration said service platform is wedged between said first and second opposing jaws at a first vertical location, and in said second service configuration said service platform is wedged between said first and second opposing jaws at a second vertical location different from said first vertical location.

2. The jaw crusher assembly of claim 1, wherein the rotation is about a horizontal axis.

3. The jaw crusher assembly of claim 1, wherein the service platform comprises:
    a first platform, the first platform being configured such that when the service platform is in the first service configuration, the first platform is horizontal; and
    a second platform that is non-parallel with said first platform, the second platform being configured such that when the service platform is in the second service configuration, the second platform is horizontal.

4. The jaw crusher assembly of claim 1, wherein the service platform further comprises:
    a first spanning portion configured to extend between opposing jaws of the material crushing apparatus in the first service configuration; and
    a second spanning portion configured to extend between opposing jaws of the material crushing apparatus in the second service configuration;
    wherein the service platform is operable between the first service configuration and the second service configuration by rotating the service platform such that the relevant spanning portion is configured to extend between opposing jaws of the jaw crushing apparatus.

5. The jaw crusher assembly of claim 4, wherein the first and/or second spanning portions are of fixed length.

6. The jaw crusher assembly of claim 4, wherein the first and second spanning portions are adjoined at respective first ends and extend therefrom towards respective second ends, the service platform further comprising a third spanning portion extending between the second ends of the first and second spanning portions.

7. The jaw crusher assembly of claim 6, wherein the third spanning portion is configured to extend between the opposing jaws in both the first service configuration and the second service configuration.

8. The jaw crusher assembly of claim 6, wherein the first, second and third spanning portions form a triangular arrangement.

9. The jaw crusher assembly of claim 6, wherein in the first service configuration the third spanning portion and the first spanning portion extend between the opposing jaws, the second spanning portion extending along a crushing face of one of the opposing jaws, or extending along the crushing surface of a liner installed on one of the opposing jaws.

10. The jaw crusher assembly of claim 6, wherein in the second service configuration the third spanning portion and the second spanning portion extend between the opposing jaws, the first spanning portion extending along a crushing face of one of the opposing jaws, or extending along the crushing surface of a liner installed on one of the opposing jaws.

11. The jaw crusher assembly of claim 6, wherein the service platform has at least one set of jaw member contact points, the at least one set of jaw member contact points comprising at least first, second, and third jaw member contact points, the first jaw member contact point is a common jaw member contact point locatable at the joined first ends of the first and second spanning portions, the second and third jaw member contact points are locatable at the respective second ends of the first and second spanning portions, at their respective joints with the third spanning portion.

12. The jaw crusher assembly of claim 11, wherein the jaw member contact points comprise roller means.

13. The jaw crusher assembly of claim 4, wherein the opposing jaws form a V-shaped crushing cavity when in the at least partially open position.

14. The jaw crusher assembly of claim 13, further including a third spanning portion extending between said first and second spanning portions, wherein the first, second and third spanning portions form a first wedge shape relative to the opposing jaws in the first service configuration, the first wedge shape forming a wedge between the opposing jaws such that the service platform is held in the first service configuration within the V-shaped crushing cavity of the crushing apparatus.

15. The jaw crusher assembly of claim 14, wherein the first, second and third spanning portions form a second wedge shape relative to the opposing jaws in the second service configuration, the second wedge shape forming a wedge between the opposing jaws such that the service platform is held in the second service configuration within the V-shaped crushing cavity of the crushing apparatus.

16. The jaw crusher assembly of claim 1 wherein, in the first service configuration, one or both of the opposing jaws have liners or wear plates installed thereon.

17. The jaw crusher assembly of claim 1 wherein, in the second service configuration, one or both of the opposing jaws have liners or wear plates installed thereon.

18. A jaw crusher assembly comprising a jaw crushing apparatus and a service platform, the jaw crushing apparatus comprising:
first and second opposing jaws, each opposing jaw having a crushing face, the crushing faces opposing each other in an oblique relationship when the opposing jaws are in an at least partially opened state;
wherein the service platform is configured to provide at least two service configurations within the opposing jaws and being operable between a first service configuration and a second service configuration by rotation of the service platform,
wherein the service platform comprises:
a first spanning portion configured to extend between opposing jaws of the material crushing apparatus in the first service configuration; and
a second spanning portion configured to extend between opposing jaws of the material crushing apparatus in the second service configuration; and
a third spanning portion extending between the second ends of the first and second spanning portions,
wherein the service platform is operable between the first service configuration and the second service configuration by rotating the service platform such that a relevant spanning portion is configured to extend between opposing jaws of the jaw crushing apparatus,
and wherein the first, second and third spanning portions form a triangular arrangement.

19. A jaw crusher assembly comprising a jaw crushing apparatus and a service platform, the jaw crushing apparatus comprising:
first and second opposing jaws, each opposing jaw having a crushing face, the crushing faces opposing each other in an oblique relationship when the opposing jaws are in an at least partially opened state;
wherein the service platform is configured to provide at least two service configurations within the opposing jaws and being operable between a first service configuration and a second service configuration by rotation of the service platform,
wherein the service platform comprises:
a first spanning portion configured to extend between opposing jaws of the material crushing apparatus in the first service configuration; and
a second spanning portion configured to extend between opposing jaws of the material crushing apparatus in the second service configuration; and
a third spanning portion extending between the second ends of the first and second spanning portions,
wherein the service platform is operable between the first service configuration and the second service configuration by rotating the service platform such that a relevant spanning portion is configured to extend between opposing jaws of the jaw crushing apparatus,
and wherein the service platform has at least one set of jaw member contact points, the at least one set of jaw member contact points comprising at least first, second, and third jaw member contact points, the first jaw member contact point is a common jaw member contact point locatable at the joined first ends of the first and second spanning portions, the second and third jaw member contact points are locatable at the respective second ends of the first and second spanning portions, at their respective joints with the third spanning portion.

* * * * *